INVENTOR
Nickolai I. Matveev
et al

BY Hancock Downing & Seebold

ATTORNEYS

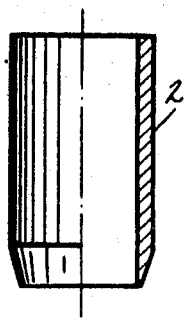
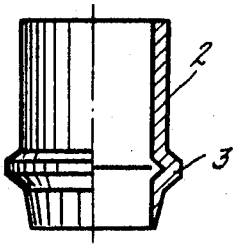
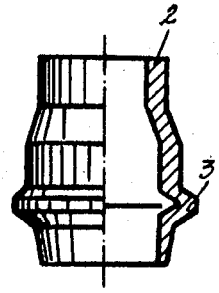
Fig. 14　　　Fig. 15　　　Fig. 16
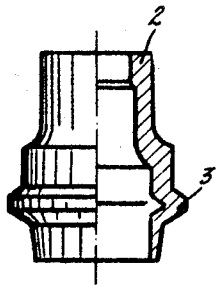
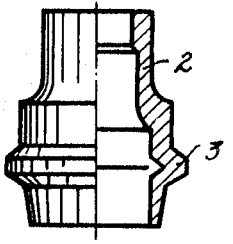
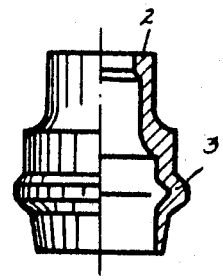
Fig. 17　　　Fig. 18　　　Fig. 19
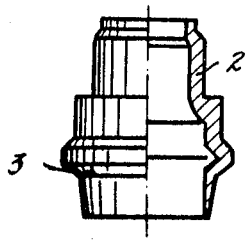
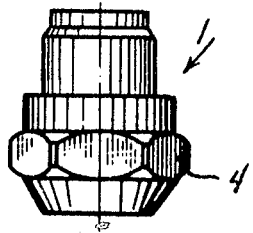
Fig. 20　　　Fig. 21

United States Patent Office 3,456,479
Patented July 22, 1969

3,456,479
METHOD OF AND APPARATUS FOR MANUFACTURING HOLLOW METAL BODIES PROVIDED WITH A POLYHEDRAL HEAD PORTION ADAPTED TO HAVE A WRENCH OR EQUIVALENT TOOL APPLIED THERETO
Nickolai Ivanovich Matveev, Ith Vostochnii pereulok II, Apt. 7, and Nickolai Alexandrovich Lesnov, Scherbakovskaia ulitsa 58a, Apt. 188, both of Moscow, U.S.S.R.
Continuation-in-part of application Ser. No. 264,741, Mar. 7, 1963. This application Aug. 18, 1967, Ser. No. 661,596
Int. Cl. B21d 22/00; B21b 17/02
U.S. Cl. 72—353                                      7 Claims

ABSTRACT OF THE DISCLOSURE

The production of hollow metal articles having a polyhedral head adopted for wrench application and more particularly the bodies of spark plugs in which a tubular blank produced by a multi-stage drawing operation is preliminarily subjected to an upsetting step until an annular bead is formed on the periphery of the blank and pressure is applied externally in a transverse direction relative to the longitudinal axis of the blank to the thus formed bead for providing the requisite number of flat surfaces constituting the polyhedral head portion of the metal body.

---

This application is a continuation-in-part of our co-pending application Ser. No. 264,741 filed Mar. 7, 1963 and entitled A Method for Manufacturing Hollow Metal Items With a Polyhedral Head for Wrench Application, now abandoned.

This invention relates to a method of and apparatus for manufacture hollow metal bodies provided with a polyhedral head portion adapted to have a wrench or equivalent tool applied thereto and more particularly, for producing spark plug bodies for use in engines of the internal combustion type.

Prior to our invention, hollow metal bodies having polyhedral heads, such as spark plug bodies, have either been turned from bar stock possessing the desired cross section, by cold heading or by extrusion followed by additional machining operations on power operated cutting tools.

The prior techniques possess certain drawbacks and in regard to the turning method, the primary disadvantages are the low coefficient of metal utilization which does not exceed 25 percent and the comparatively high labor input required. With respect to the cold heading or the extrusion method, these techniques result in rapid wear of the die and the necessity for the employment of sturdy special equipment, as well as special steels for the body to be produced. In addition, subsequent additional machining steps are required at those locations necessitating greater accuracy, such as the surfaces prepared for thread rolling, internal recesses in the body, etc.

An important object of the present invention is the provision of a method for producing hollow metal bodies, particularly spark plug bodies, which overcomes the above and other disadvantages present in this art.

Viewing the invention from its broadest aspect, it comprises the steps of preliminarily subjecting a tubular blank produced by a multi-stage drawing operation to an unsetting operation until an annular bead is provided on the periphery of the tubular blank, and applying pressure externally to the thus formed bead in a transverse direction relative to the longitudinal axis of the blank for forming the requisite number of flat surfaces which flat surfaces define the polyhedral head portion of the metal body.

More specifically, following the formation of the bead on the outer periphery of the tubular body in the area thereof which constitutes the head portion fo the body, the inner and outer surfaces of the body, except for the bead, are supported for preventing distortion of the shape of the body and the wall thickness and a series of flat faced tools are moved in a direction transverse to the longitudinal axis of the body for applying the bead into a series of flat surfaces about the body which provide the polyhedral head portion.

Figures 1, 2, 3:
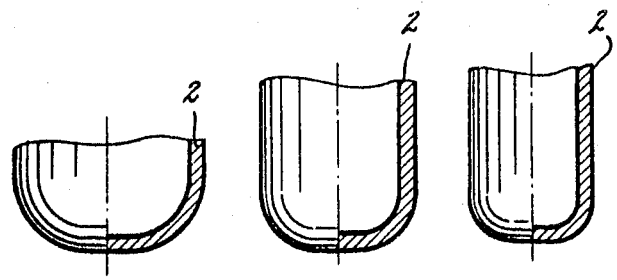
Figures 4, 5, 6:
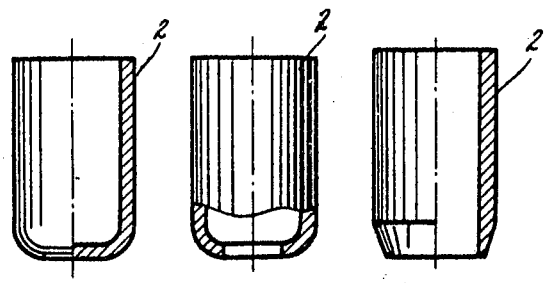
Figures 7, 8, 9:
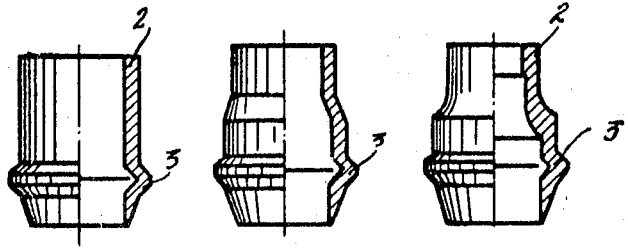
Figures 10, 11, 12, 13:
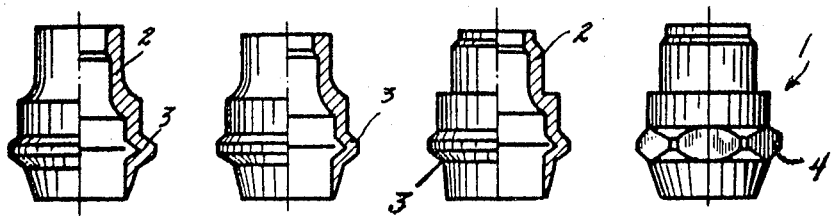
Figures 22, 23:
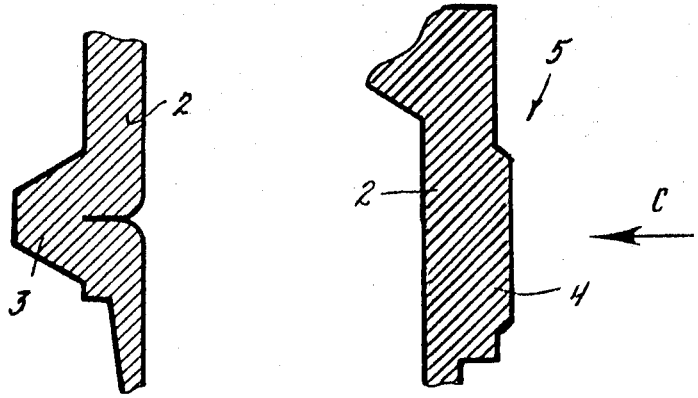
Figure 24:
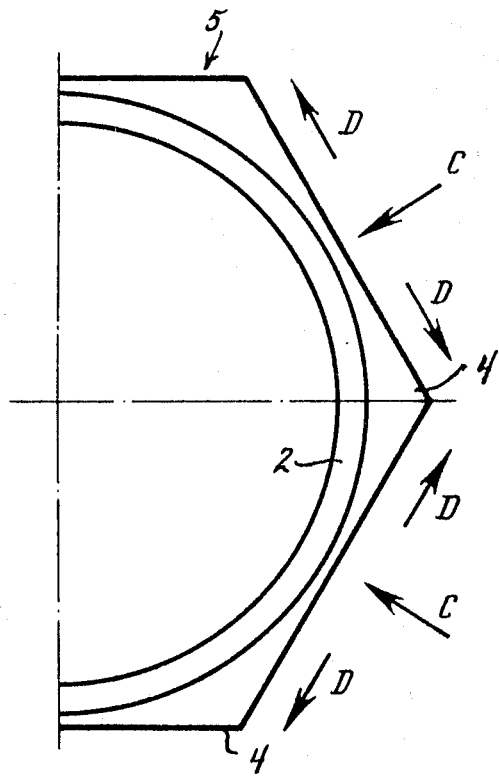
Figure 25:
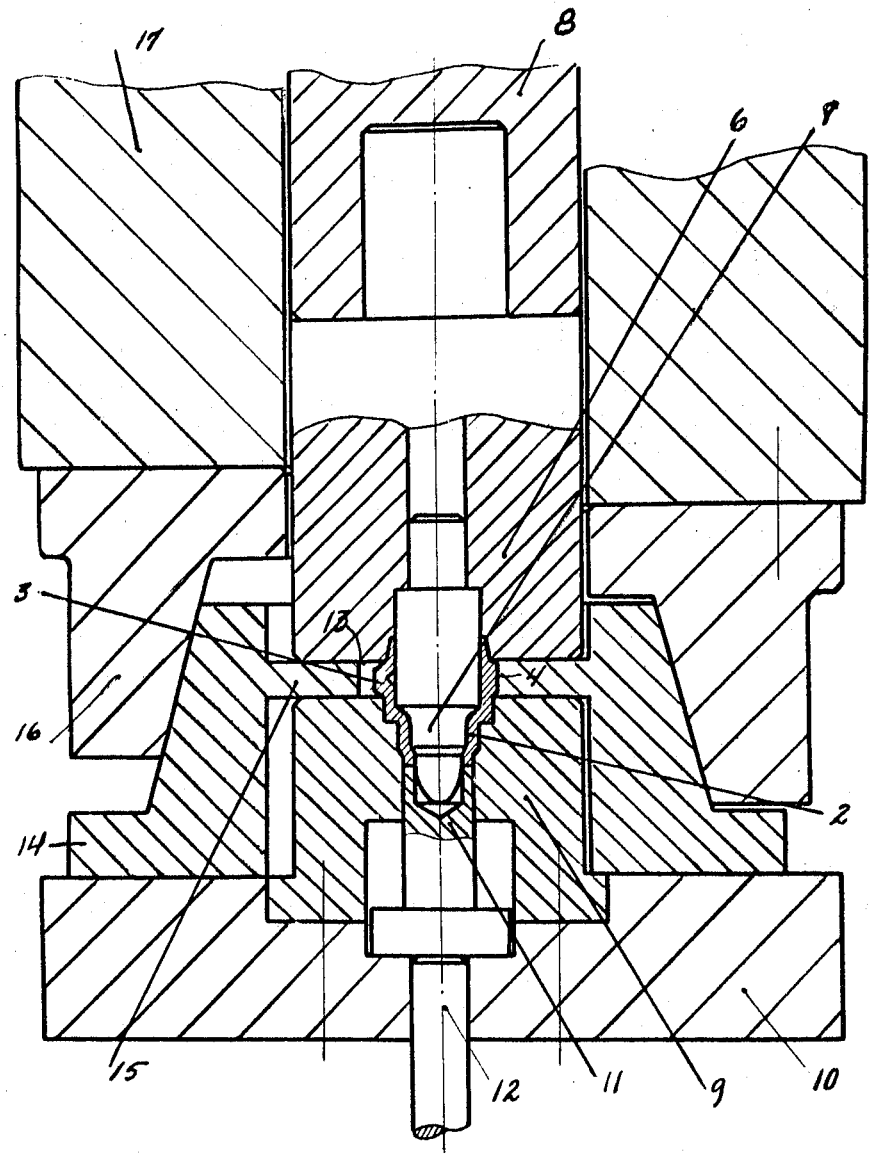
Figure 26:
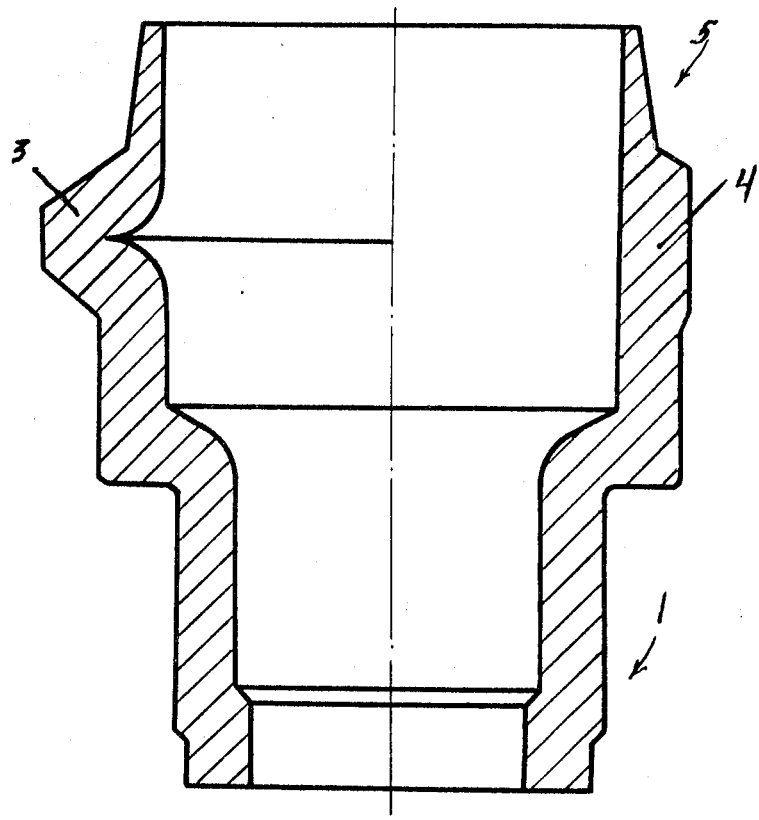

Additional objects and advantages of the present invention will become more readily apparent to persons skilled in the art from the ensuing detailed description and attached drawings and in which drawings:

FIGURES 1–13 illustrate diagrammatically the sequence of steps for producing a spark plug body from sheet steel, FIGURES 14–21 illustrate diagrammatically the sequence of steps for producing a similar body from steel pipe, FIGURE 22 is a fragmentary vertical sectional view on an enlarged scale of the bead formed on the blank periphery, FIGURE 23 is an enlarged fragmentary sectional view of one of the flat faces constituting the polyhedral head portion formed from the bead, FIGURE 24 is a fragmentary top plan view illustrating the hexagonal head portion shown in FIGURE 23, FIGURE 25 is a vertical sectional view, partly in elevation, of a die assembly and FIGURE 26 is a vertical sectional view of a spark plug body with the left hand side illustrating the preliminarily formed bead and the right hand side the flat face following the external application of pressure to the bead.

With reference to FIGURES 1–13 which disclose the manufacture of a spark plug body 1 from sheet steel, the several figures show the sequence of consecutive cold heading steps on a tubular blank 2 to provide an annular bead 3 on the outer periphery thereof by means of longitudinal compression. In FIGURE 22, it will be noted that the bead 3 possesses a thickness substantially twice the thickness of the wall of the blank 2.

Instead of using sheet steel for the starting material, the necessary results can be accomplished by employing steel pipe including electric welded pipe and such a process is disclosed in the consecutive operations illustrated in FIGURES 14–21.

The bead 3 is converted or transformed into the requisite or desired number of flat faces 4 for providing a polyhedral head portion 5. In the embodiment disclosed the hexagonal head portion is produced by the application from the outside of pressure or a squeezing force to the bead 3 in a direction transverse to the longitudinal axis of the blank 2. As a consequence, the bead 3 shown in FIGURE 22 is transformed to the six flat faces illustrated in FIGURES 23 and 24.

In order to provide the polyhedral head portion 5, dies of various designs may be used provided the dies ensure the closing of the blank and limiting the movement of its outer and inner surfaces for preventing distortion of its shape and wall thickness, yet at the same time, permitting access to the annular bead 3 so that the bead can be subjected to the action of pressure or squeezing tools for providing the desired polyhedral configuration to the head portion 5.

An arrangement for effecting the desired results above mentioned is illustrated in FIGURE 25 and such arrangement comprises a double action press constituted by inner and outer slides. The inner slide includes a punch 6 carrying or having operably related thereto a mandrel 7. The punch 6 is suitably coupled to a press 8 of the inner slide. A matrix 9 is supported by a plate 10 and is provided with a supporting means 11 and an extruder pin 12 cooperable therewith.

It will be noted that the bead 3 of the blank is located in a gap or space 13 provided between the punch 6 and the upper surface of the matrix 9. A frusto-conical member 14 consisting of a plurality of parts is mounted with its base on the plate 10 and such member is provided with a plurality of horizontal components 15 which are located within the gap or space 13. The number of components 15 corresponds to the number of faces 4 to be provided on the head portion and the free ends of the components 15 are flat. A complementary frusto-conical member 16 is conveniently attached at its base to a press 17 of the outer slide so that when the press 17 moves downwardly, the frusto-conical member 16 will displace the frusto-conical member 14 inwardly and as a result, the flat free faces of the components 15 will press or squeeze the bead 3 to form the flat faces 4 and such pressing or squeezing action is applied to the bead from the outside.

The operation is as follows:

The blank 2 having the preliminarily formed bead 3 is positioned into the matrix 9 and the press 8 supporting the punch 6 and mandrel 7 is lowered. The mandrel 7 enters the blank and remains in the position illustrated in FIGURE 25 until the press 17 supporting the frusto-conical member 16 lowers and moves the frusto-conical member 14 in an inward direction so that the components 15 press or squeeze the bead 3 for producing the flat faces 4.

Following the foregoing operation, the press 8 together with the punch 6 and mandrel 7 are raised and thereafter the press 17 and frusto-conical member 16 are moved upwardly. The body 1 with the thus formed polyhedral head portion 5 is ejected from the matrix 9 by the supporting means 11 and extruder pin 12.

The above sequence is repeated for the next blank.

Referring now to FIGURE 26, there is disclosed a spark plug body 1 wherein the left hand side of the figure illustrates the preliminary formed bead 3 prior to the pressing action whereas the left hand side illustrates the flat face 4 produced by such pressing or squeezing action. As clearly shown in FIGURE 24, the above mentioned pressing or squeezing action is effected in the direction indicated by the arrows C. During this action, part of the surplus metal of the bead 3 flows, due to plastic deformation, to the vertices of the hexagon or along the arrows D. As a consequence, there is provided a polyhedral head portion of adequate strength capable of carrying the same loads as a head portion turned from hexagonal steel bar stock.

This invention permits the body to be handled on ordinary presses of relatively low capacity, such as are used for forming and drawing sheet metal, i.e., automatic transfer presses equipped with means for automating the manufacture of the same and similar bodies. In the event a pipe is employed as a starting medium, the present invention provides for a metal utilization coefficient up to 95% and the time required for producing a single body is reduced substantially. The dies used in conjunction with the inventive concept are very simple from a structural point of view and can be made from simple steel.

The invention is not to be confined to any strict conformity to the showings in the drawings but changes or modifications may be made therein so long as such changes or modifications mark no material departure from the spirit and scope of the appended claims.

What is claimed is:

1. A method for manufacturing hollow metal bodies having a polyhedral head portion adapted to have a wrench applied thereto and particularly metal bodies for spark plugs used in internal combustion engines, including preliminarily forming a bead on the outer periphery of a tubular body in the zone thereof constituting the head portion, limiting the movement of the inner and outer surfaces of the body except said bead for preventing distortion of the body and wall thickness, and applying pressure from the outside to the bead in directions transverse to the longitudinal axis of the body for transforming the bead into a series of flat faces about the body thus providing the polyhedral head portion.

2. The method for manufacturing hollow metal bodies as claimed in claim 1 in which the preliminarily formed bead is hollow.

3. The method for manufacturing hollow metal bodies as claimed in claim 1 in which the bead is formed on a metal blank.

4. The method for manufacturing hollow metal bodies as claimed in claim 1 in which the bead is formed on a metal pipe.

5. The method for manufacturing hollow metal bodies as claimed in claim 1 in which the step of applying pressure from the outside to the bead comprises moving a series of flat faced tools simultaneously in directions transverse to the longitudinal axis of the body for applying a squeezing action on the bead thereby transforming the bead into a series of flat surfaces and displacing the tools away from the body following the formation of the series of flat surfaces.

6. An apparatus for manufacturing hollow metal bodies having a polyhedral head portion adapted to have a wrench applied thereto and particularly metal bodies or spark plugs for use in internal combustion engines, comprising means for supporting the inner and outer surfaces of a body having a bead formed thereabout with such supporting means preventing distortion of the shape of the body and the wall thickness, a series of flat faced tools, means for moving said flat faced tools simultaneously in a direction transverse to the longitudinal axis of the body for applying a squeezing action on the bead thereby transforming the bead into a series of flat surfaces about the body which provides the polyhedral head portion, and means for displacing said series of tools away from the body following the formation of the series of flat surfaces about the body.

7. The apparatus for manufacturing hollow metal bodies as claimed in claim 6 in which said supporting means includes a matrix for receiving a tubular hollow body provided with a preliminary formed bead thereabout, a slide member movable toward and away from the matrix, a mandrel for said slide member for entering said tubular body cooperable with the matrix for supporting the inner and outer surfaces of said tubular body, the slide being positioned to provide a gap between the slide and the matrix with said series of flat faced tools being movable into said gap for cooperation with said bead.

References Cited

UNITED STATES PATENTS

| 1,152,853 | 9/1915 | Stewart | 72—356 |
| 1,286,384 | 12/1918 | Mezger | 72—377 |
| 1,934,752 | 11/1933 | Wilcox | 10—86 |

CHARLES W. LANHAM, Primary Examiner

L. A. LARSON, Assistant Examiner

U.S. Cl. X.R.

10—86; 72—370, 402